Dec. 5, 1944.    W. A. HYLAND    2,364,296
TRASH SHIELD
Filed Dec. 22, 1941    2 Sheets-Sheet 1

INVENTOR
WILLIAM A. HYLAND
BY
ATTORNEYS

Dec. 5, 1944.  W. A. HYLAND  2,364,296
TRASH SHIELD
Filed Dec. 22, 1941  2 Sheets-Sheet 2
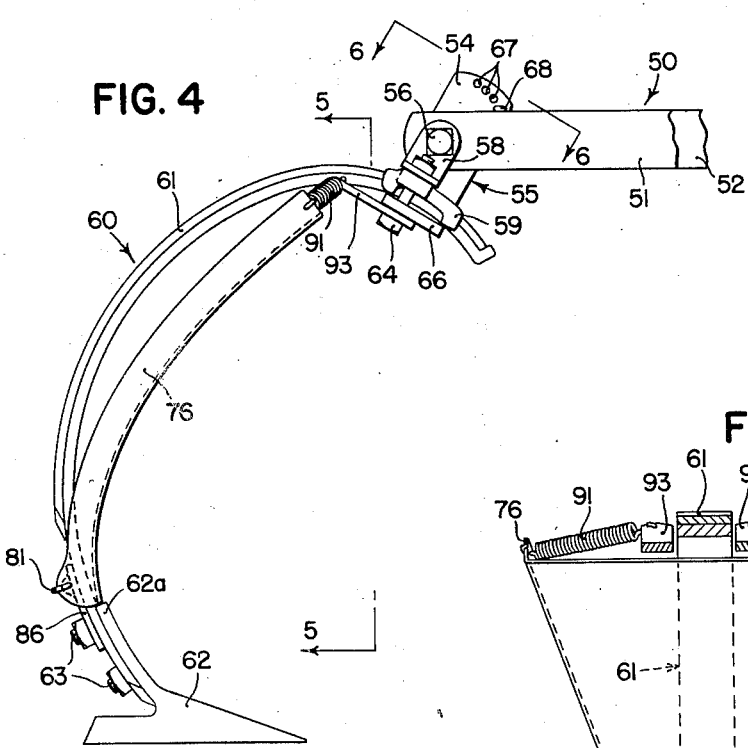
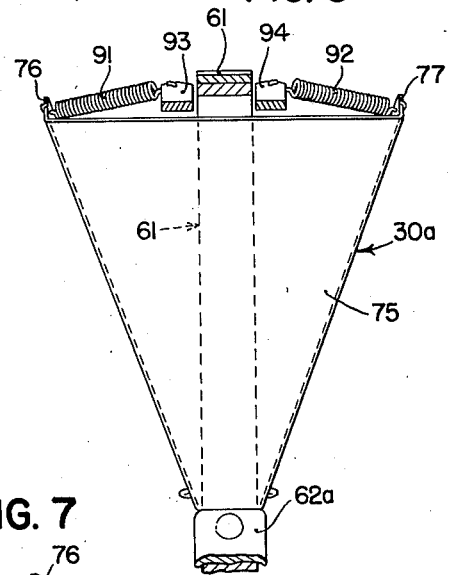
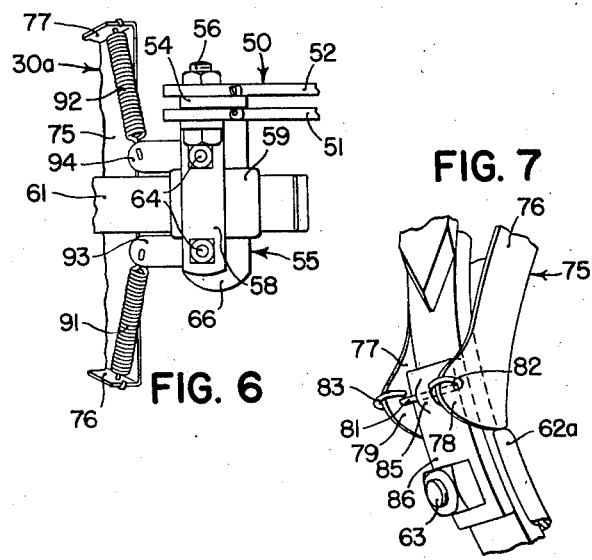
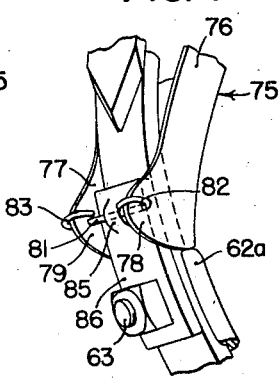
INVENTOR
WILLIAM A. HYLAND
BY
ATTORNEYS Patented Dec. 5, 1944

2,364,296

UNITED STATES PATENT OFFICE 2,364,296

TRASH SHIELD

William A. Hyland, Horicon, Wis., assignor to The Van Brunt Manufacturing Company, Horicon, Wis., a corporation of Wisconsin Application December 22, 1941, Serial No. 424,017

11 Claims. (Cl. 97—194)

The present invention relates generally to agricultural implements and more particularly to ground working implements of the field cultivator type in which cultivator teeth are drawn through the ground for stirring the soil, destroying weeds and cultivating alfalfa and other crops.

The object and general nature of the present invention is the provision of a machine of this type equipped with vine shields rockably disposed in front of the teeth for preventing weeds, vines, trash and the like from wrapping around the tool shanks and interfering with the proper operation of the machine. More specifically, it is a feature of this invention to provide a field cultivator with generally V-shaped vine shields arranged with the apical portions of the teeth in a position just above the ground working shovels and resiliently connected at their upper ends so that the shields may turn to one side or the other so as to dump an accumulation of trash and the like and prevent it from wrapping around the tool shanks.

More specifically, it is a further feature of this invention to provide a curved tapered or substantially V-shaped vine shield for each cultivator tooth, so arranged that at the lower end the tooth is substantially no wider than the shank of the tool, whereby the shield does not form a furrow or trench in the soil, the shield curving upwardly and forwardly and increasing in width, thereby not only making a smooth junction with the cultivator shovel but also facilitating the movement of the trash and the like away from the shovel up onto the wider portion of the shield so that turning or twisting of the latter acts to shed the trash to one side or the other and thereby prevents any objectionable accumulation of trash in front of the tool.

These and other objects and advantages of the present invention will be apparent to those skilled in the art after a consideration of the following detailed description, taken in conjunction with the accompanying drawings in which the preferred structure has been illustrated.

In the drawings:

Figure 4 is a side view of a drag bar of a spring tooth cultivator in which the principles of the present invention have been incorporated;

Figure 5 is a view taken generally along the line 5—5 of Figure 4;

Figure 6 is a view taken generally along the line 6—6 of Figure 4; and

Figure 7 is a fragmentary perspective view showing the manner of connecting the lower apical portion of the trash shield through the lower part of the spring tooth shank.

Figure 1:
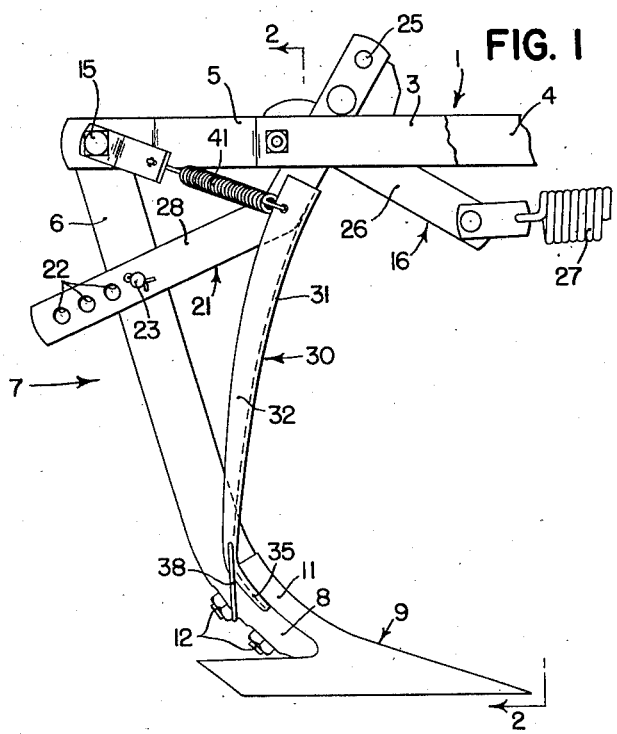
Figure 1 is a side view of the rear portion of one of the drag bars of a field cultivator in which the principles of the present invention have been incorporated, the drag bar being of the stiff tooth type.
Figure 2:
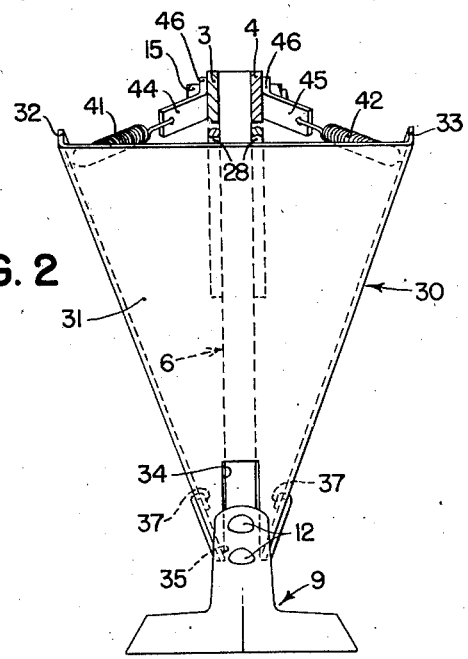
Figure 2 is a sectional view taken generally along the line 2—2 of Figure 1.
Figure 3:
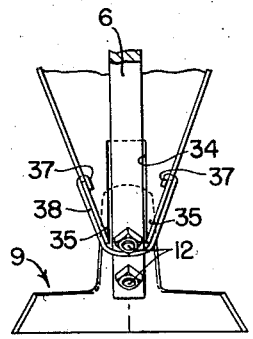
Figure 3 is a fragmentary rear view, illustrating the manner of loosely connecting the lower apical portion of the shield to the tool shank.

Referring now more particularly to Figures 1-3, the field cultivator, a part of which is shown in Figure 1, is substantially like that shown in United States Patent 2,032,085, to Theodore J. Erdman, dated February 25, 1936, to which reference may be made if desired. Briefly, the field cultivator includes a plurality of drag bars and associated tools, one of the drag bars being indicated in Figure 1 by the reference numeral 1, each drag bar consisting of a pair of generally longitudinally extending strap members 3 and 4 having rear ends which converge rearwardly, as at 5, and are spaced apart rearwardly of the converging portions 5 to receive therebetween the upper end of the shank 6 of a cultivator tooth, indicated in its entirety by the reference numeral 7. The tooth 7 includes the tool shank 6, which curves downwardly and forwardly at its lower end, as at 8, and a ground working shovel member 9 having an upwardly extending central portion 11 that is apertured to receive a pair of attaching bolts 12 by which the shovel 9 is fixed to the lower end of the shank 6. The tool shank 6 is pivotally connected with the rear ends of the drag bars 3 and 4 by a bolt 15 but is restrained from pivoting rearwardly by spring trip mechanism indicated in its entirety by the reference numeral 16, which may be substantially like that shown in United States Patent 1,984,705, issued December 18, 1934, to John Schaeffer. Briefly, the spring trip mechanism 16 includes a link 21 pivotally connected by means of a plurality of openings 22 and a pivot pin 23 to the upper portion of the tool shank 6, the link 21 being also pivoted, as at 25, to a spring biased arm 26 to which the rear end of the spring 27 is connected. Preferably, the link 21 includes a pair of members 28 disposed on opposite sides of the tool shank 6, as best shown in Figure 2.

Coming now to the feature with which the present invention is more particularly concerned, a vine shield 30 is disposed in front of the tool shank 6 and comprises a generally V-shaped or tapered plate member 31 having side flanges 32 and 33 and mounted with the wider portion upwardly. The lower or apical portion of the V-shaped trash shield is formed with a slotted or bifurcated section 34 which is adapted to receive the lower portion of the tool shank 6, just above the shovel 9, and as best shown in Figure 1, the bifurcated section 34 of the trash shield is formed with a forward bend, as indicated by the reference numeral 35 in Figure 1, the portions 35 being disposed behind the attaching portion 11 of the shovel 9. As best shown in Figures 2 and 3, the width of the lower portion of the trash shield is approximately the same as the tool shank 6. The lower portions of the flanges 32 and 33 just above the bent portion 35 of the trash shield, are apertured to receive the upper bent ends 37 of an attaching loop member 38 that passes around the lower end of the tool shank and is engaged underneath the upper bolt 12, as best shown in Figures 1 and 2. This connection is, however, appreciably loose so that the trash shield may turn about a generally vertical axis and, if necessary, rock a limited amount laterally about the point or points of contact between the slotted section 34 and the lower portion of the shank 8.

The upper or wider portion of the trash shield is formed to rest against the forward edge of the adjacent portion of the link member 21. At the upper end of the trash shield, the flanges 32 and 33 are apertured to receive the outer ends of a pair of springs 41 and 42. The laterally inner ends of these springs are connected to attaching clips 44 and 45, each of which is provided with a bent end 46 adapted to be fastened in place by the pivot bolt 15 that connects the upper end of the tool shank 6 to the rear ends of the drag bars 3 and 4. The springs 41 and 42 are under tension, but the tension in one spring substantially balances the tension in the other spring, whereby the vine shield or trash shield is normally held in an intermediate central position, that is, a position in front of the shank 6 and extending laterally thereof, as shown in Figures 1 and 2, but can swing to one side or the other, such lateral swinging being limited in either direction by the increased tension of the spring at the side where the shield swings forwardly. If lateral swinging toward one side or the other should become excessive, it is further limited by the shield coming into contact with one side or the other of the shank 6 or members 28. The attaching loop 38 and the contact between the trash shield and the forward edge of the link member 21 serve to determine a substantially vertical axis about which the shield 30 may rock laterally.

In operation, as the shovel 9 passes along under the surface of the ground, vines, weeds and other trash or the like that would otherwise tend to wrap around or become entangled on the tool shank 6 are forced generally upwardly along the forward face of the trash shield plate 31 onto the wider portions thereof, with the result that the shield tips to one side or the other, thereby shedding the trash before it accumulates to any objectionable extent. After the trash has been dumped the springs 41, 42 return the shield to its central position. The tension in the springs 41, 42 may be adjusted, if desired, by rocking the clips 44, 45 upwardly or downwardly and tightening the bolt 15 to secure them in adjusted position.

The form of the invention shown in Figures 4-7 is similar to that just described except that it is particularly adapted for mounting on the teeth of a spring tooth cultivator. In this form of the invention the drag bar is indicated by the reference numeral 50 and comprises a pair of strap members 51 and 52 spaced apart at their rear ends to receive therebetween the vertical arm 54 of an adjusting bracket 55, the bars 51 and 52 and the arm 54 being apertured to receive a pivot bolt 56 connecting the parts together. The bracket 55 also includes a clamping member 58 which is formed to receive a socket member 59 in which the forward and upper end of a spring tooth 60 is received. The spring tooth 60 includes a spring shank 61 and a shovel 62 secured by bolts 63 to the lower end of the spring member 61. Bolts 64 serve to secure the clamp 58, the socket 59 and the upper end of the spring 61 to the laterally extending portion 66 of the bracket 55. The arm 54 of the bracket 55 is provided with a plurality of apertures 67 to receive a break pin 68 which, in operation, rests against the upper edges of the drag bars 51, 52. The pressure of the earth against the shovel 62 tends to cause the tooth 60 to swing about the axis of the pivot bolts 56, but this is restrained by the engagement of the break pin 68 with the drag bars, but if the tool comes into contact with an unyielding object, the pin 68 will shear off, thereby releasing the tool.

The vine shield for this form of tool is quite similar to the vine shield described above and is indicated in its entirety by the reference numeral 30a. The vine shield 30a comprises a generally triangular plate 75 having flanges 76 and 77 at the sides. The lower or apical end of the trash shield plate 75 is formed with the flanges 76 and 77 extended, as at 78 and 79 which, in effect, serves as a bifurcated portion embracing the lower part of the spring member 61. The extensions 78 and 79 are apertured to receive a fastening member 81, the ends of which are looped, as at 82 and 83, through the apertures in the flange extensions 78 and 79. The central portion of the loop member passes through a lug 85 formed on a plate 86. The plate 86 is secured in place by one of the bolts 63 (Figure 4). The lower or apical end of the trash plate 75 rests against the upper end of the shank 62a of the shovel 62, providing a smooth surface for trash and the like to pass off the shank of the shovel onto the shield plate 75. The upper or wider portion of the plate 75 is connected by resilient means with the upper end of the tool 60, such means preferably comprising a pair of springs 91 and 92 which, at their outer ends, are looped into openings formed in the upper ends of the flanges 76 and 77. The inner ends of the springs are looped into openings formed in a pair of clips 93 and 94 which are fastened under the heads of the bolts 64, as best shown in Figure 6. The tension in the springs 91 and 92 may be adjusted by loosening the bolts 64 and shifting the rear ends of the clips 93 and 94 in one direction or the other. From Figure 4 it will be noted that the two springs 91 and 92 are disposed in a transverse plane, and therefore these members serve resiliently to hold the upper end of the vine shield plate 75 in position but accommodates lateral swinging and twisting or tipping of the member about a generally vertically extending axis, the loop connection 81 at the lower end of the member 75 being sufficiently loose to accommodate relative movement between the trash shield and the spring member 61. The shield is, however, held down against the upper end of the shank 62a of the shovel 62. It will be noted from Figure 4 that the shield is curved so that as the tool progresses through the ground, any trash, vines, weeds and the like that might otherwise become entangled on the spring tooth member 61 are forced by the pressure of the soil up onto the wider portion of the shield, and since the latter is free to tilt or roll toward one side or the other, the trash is rapidly shed and is prevented from accumulating in any objectionable amounts. The shield shown in Figures 1–3 is also curved, and the advantage of a curved shield is that it permits a smoother junction with the shovel so that the trash and the like is moved without delay up onto the wider part of the shield from which it can easily be discharged. Like the form of the invention shown in Figure 3, lateral swinging of the shield 75 shown in Figures 4–7 is limited by the springs 91, 92 and the part 61.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In a field cultivator, a cultivator tooth having a ground working portion, a generally V-shaped trash shield disposed in front of said tooth with the apex adjacent said ground working portion, said shield being movable relative to the tooth about a generally upwardly extending axis, and spring means connecting said trash shield with said tooth and reacting against the latter to yieldingly hold the shield in substantially a central position about said axis.

2. In a ground working agricultural implement, a generally vertically disposed tool supporting member, a ground working tool connected with the lower end of said member, a vine shield comprising a generally V-shaped member relatively wide at its upper end and tapering downwardly, the lower end being bifurcated so as to embrace a portion of said tool supporting member, means rockably connecting the bifurcated lower end of said shield with said tool supporting member rearwardly of the tool thereon, and means swingably connecting the relatively wide portion of said shield with said tool supporting member, said rockable and swingable connecting means establishing a generally vertical axis about which said shield may move, thus providing for lateral movement of said shield toward one side or the other in order to free the tool supporting member of trash and the like.

3. In a ground working agricultural implement, a generally vertically disposed tool supporting member, a ground working tool connected with the lower end of said member, a vine shield comprising a generally V-shaped member relatively wide at its upper end and tapering downwardly, the lower end being bifurcated and embracing a portion of said tool supporting member, means rockably connecting the bifurcated lower end of said shield with said tool supporting member rearwardly of the tool thereon, means cooperating with said rockable connecting means for establishing a pivot connection with said tool supporting member so that said shield can swing laterally about a generally vertical axis, and spring means serving to yieldably hold said vine shield in a central position in front of the tool supporting member.

4. In an agricultural implement including a ground working shovel and a tool shank to which the shovel is connected, a vine shield comprising a generally flat V-shaped member having flanges at the sides thereof, means rockably connecting the lower apical portion of said shield with the tool shank just above the shovel with the lower portions of the flanges on opposite sides of the shank, and a pair of tension members connected, respectively, at their outer ends with the flanges at the upper end of said shield and extending generally laterally inwardly therefrom to points of connection with the upper portion of said tool shank.

5. In an agricultural implement including a ground working shovel and a tool shank to which the shovel is connected, a vine shield comprising a generally flat V-shaped member having flanges at the sides thereof, means rockably connecting the lower apical portion of said shield with the tool shank just above the shovel with the lower portions of the flanges on opposite sides of the shank, a pair of clips adjustably fixed to the upper portion of said tool shank, and spring means extending laterally outwardly from said clips to the laterally outer flanges at the upper part of said shield, adjustment of said clips serving to provide more or less tension in said springs as desired.

6. A trash shield for a cultivator tooth or the like, comprising a generally V-shaped plate member having side flanges, the lower end of said member being bifurcated so as to embrace the lower portion of the associated tooth, means movably connecting the lower portion of the trash shield with said tooth, a pair of springs connected at their outer ends with the upper and wider portion of said shield, and a pair of attaching clips connected with the inner ends of said springs and adapted to be connected with the associated cultivator tooth to dispose the shield substantially in front of the latter.

7. The combination with a ground working member including a ground working shovel, a drag beam, a tool shank supporting said shovel and a link member extending forwardly and upwardly from said tool shank to said drag beam, of a vine shield mounted for rocking movement in front of said tool shank and engaging the latter at its lower end and said link member between the ends of the latter, thereby defining a generally vertical axis of rocking movement of said shield.

8. The combination with a ground working cultivator including a ground working shovel and a support therefor including a spring member connected at its lower end with said shovel, of a vine shield disposed in front of said spring member and rockably connected with the lower end thereof adjacent said shovel, and a pair of springs connected with the upper end of said shield and extending substantially laterally inwardly in substantially the same plane and connected at their laterally inner ends with said support, whereby said shield is connected resiliently for rocking movement about a generally vertical axis.

9. A trash shield for a ground working tool having a supporting shank, comprising a tapered plate member disposed transversely in front of said shank with the wider portion upwardly and the lower portion having a bifurcated section adapted to receive the lower portion of said shank, means for loosely attaching said shield to said shank including a loop member passing around the lower portion of said tool shank and having ends attached to said bifurcated portions, and means connected with the upper portion of said supporting shank for holding the upper portion of said plate member in place relative to said shank.

10. A trash shield for a ground working tool having a beam and supporting shank, comprising a tapered plate member disposed transversely in front of said shank with the wider portion upwardly and having rearwardly turned flanges along opposite sides, a securing member attached to said flanges and looped behind said shank, and opposed resilient means anchored to said beam and extending to the side edges of said plate, for yieldingly holding the latter in a central position in front of said shank.

11. A trash shield for a ground working tool having a portion to operate normally under the surface of the ground and a second portion to operate above the ground surface, comprising an approximately flat plate member, means connecting the lower part of said plate member with the lower part of said second portion of said tool to accommodate lateral movement of the upper part of said plate member relative to said tool, and spring means connecting the upper portion of said plate member with the upper part of said second portion of said tool and yieldably restraining movement of said plate member relative to the tool in a generally lateral direction.

WILLIAM A. HYLAND.